United States Patent
Gao et al.

(10) Patent No.: US 11,284,335 B2
(45) Date of Patent: Mar. 22, 2022

(54) METHOD, A DEVICE AND A MEDIUM FOR OBTAINING AND PROVIDING ACCESS INFORMATION OF A WIRELESS ACCESS POINT

(71) Applicant: SHANGHAI SHANGWANG NETWORK TECHNOLOGY CO., LTD., Shanghai (CN)

(72) Inventors: Chao Gao, Shanghai (CN); Yinglin Cui, Shanghai (CN)

(73) Assignee: SHANGHAI SHANGWANG NETWORK TECHNOLOGY CO., LTD., Shanghai Ot (CN)

( * ) Notice: Subject to any disclaimer, the term of this patent is extended or adjusted under 35 U.S.C. 154(b) by 26 days.

(21) Appl. No.: 16/874,693

(22) Filed: May 15, 2020

(65) Prior Publication Data

US 2020/0280904 A1    Sep. 3, 2020
US 2021/0160762 A9    May 27, 2021

Related U.S. Application Data

(63) Continuation of application No. PCT/CN2018/118710, filed on Nov. 30, 2018.

(30) Foreign Application Priority Data

Nov. 15, 2017    (CN) .......................... 201711128038.7

(51) Int. Cl.
    *H04W 48/08*    (2009.01)
    *H04W 4/14*    (2009.01)
    (Continued)

(52) U.S. Cl.
    CPC ............. *H04W 48/08* (2013.01); *H04W 4/14* (2013.01); *H04W 48/16* (2013.01); *H04W 88/08* (2013.01)

(58) Field of Classification Search
    CPC ....... H04W 48/08; H04W 48/16; H04W 4/14; H04W 88/08
    See application file for complete search history.

(56) References Cited

U.S. PATENT DOCUMENTS

| 9,801,057 | B2* | 10/2017 | Xia ....................... H04W 76/10 |
| 2007/0197237 | A1 | 8/2007 | Powell et al. |
| 2018/0212921 | A1* | 7/2018 | D'Sa ....................... H04L 51/22 |

FOREIGN PATENT DOCUMENTS

| CN | 102638797 A | 8/2012 |
| CN | 102970765 A | 3/2013 |

(Continued)

OTHER PUBLICATIONS

Shanghai Siji; "What is Dedicated Data? What is the Difference Between Dedicated Data and General Data? All You Have To Know is Here!"; U Path Dedicated Data; Aug. 11, 2017.

*Primary Examiner* — Wayne H Cai
(74) *Attorney, Agent, or Firm* — Kilpatrick Townsend & Stockton, LLP

(57) ABSTRACT

Disclosed are a method, a device and a medium for obtaining and providing access information of a wireless access point. The method comprises: searching for wireless access points to obtain identification information of one or more wireless access points; determining whether mobile data is available; if yes, sending an access information query request via mobile data, wherein the access information query request comprises the identification information of the one or more wireless access points; if no, sending a query request short message via a short message channel, wherein the query request short message comprises the identification information of the one or more wireless access points; receiving access information of the one or more wireless
(Continued)

access points returned by a network device in response to the access information query request or the query request short message.

18 Claims, 6 Drawing Sheets

(51) Int. Cl.
    *H04W 48/16*     (2009.01)
    *H04W 88/08*     (2009.01)

(56) References Cited

FOREIGN PATENT DOCUMENTS

| | | |
|---|---|---|
| CN | 104618991 A | 5/2015 |
| CN | 106162818 A | 11/2016 |
| CN | 106358189 A | 1/2017 |
| CN | 106792682 A | 5/2017 |
| CN | 108040356 A | 5/2018 |
| KR | 20120004747 A | 1/2012 |

* cited by examiner

METHOD, A DEVICE AND A MEDIUM FOR OBTAINING AND PROVIDING ACCESS INFORMATION OF A WIRELESS ACCESS POINT

CROSS REFERENCE TO THE RELATED APPLICATION

This application is the continuation application of International Application No. PCT/CN2018/118710, filed on Nov. 30, 2018, which is based upon and claims priority to Chinese Patent Application No. 201711128038.7, filed on Nov. 15, 2017, the entire contents of which are incorporated herein by reference.

FIELD

The present specification relates to computer technologies, and particularly relates to a method, a device and a medium for obtaining and providing access information of a wireless access point.

BACKGROUND

With the popularity of mobile communications, more and more user terminal devices are connected to the network through wireless access points or mobile data. For example, people can surf the Internet through mobile data of mobile phones (for example, 3G (3rd-Generation, the third-generation mobile communication technology) or 4G (4th-Generation, the fourth generation mobile communication technology)), or they can connect to WiFi (Wireless-Fidelity) hotspots through mobile phones for Internet access. However, user's mobile data is limited, and a login password is required to connect to a WiFi, which means the user's Internet access requirements cannot be satisfied.

In the prior art, in order to facilitate solving the networking problem of the user equipment, it is possible to log in to the network after obtaining a login password of a shared wireless access point (for example, a WiFi or a mobile hotspot). In the process of obtaining the login password, it is necessary to establish a connection with an access point information storage server through the mobile data of the user's mobile phone and request to obtain the login password for the wireless access point from the access point information storage server. When the data of the user equipment (e.g., user's mobile phone) is exhausted, the user equipment cannot connect to the mobile operator and thus cannot obtain a login password of a shared wireless access point, which will eventually lead to the user equipment's inability to access the Internet through the shared wireless access point.

Based on the prior art, a solution enabling a user to connect with a shared wireless access point under any circumstances is needed.

SUMMARY

The method, device and medium for obtaining and providing access information of a wireless access point provided in the embodiments of the present specification are used to solve the following problems: a solution capable of connecting with a shared wireless access point under any circumstances.

A method for obtaining access information of a wireless access point at a user equipment is provided by an embodiment of the specification. The method comprises:

searching for wireless access points to obtain identification information of one or more wireless access points;
determining whether mobile data is available;
if yes, sending an access information query request via mobile data, wherein the access information query request includes the identification information of the one or more wireless access points;
if no, sending a query request short message via a short message channel, wherein the query request short message includes the identification information of the one or more wireless access points; and
receiving access information of the one or more wireless access points which is returned by a network device in response to the access information query request or the query request short message.

In one embodiment, in the above method, determining whether mobile data is available comprises:
determining whether mobile data of the user equipment is available;
if yes, determining that mobile data is available;
if no, determining that mobile data is unavailable.

In one embodiment, in the above method, sending the access information query request via mobile data comprises:
determining whether general data is available;
if yes, sending the access information query request via general data;
if no, sending the access information query request via dedicated data.

In one embodiment, in the above method, sending the access information query request via general data comprises:
sending the access information query request to an access point information storage server by using a data channel that is between the user equipment and the access point information storage server and is provided by a mobile operator, for processing by the access point information storage server.

In one embodiment, in the above method, when the access information query request is sent via general data, the access information query request further includes an identifier of an application using general data, so that the mobile operator converts the general data consumed by the sending of the access information query request into dedicated data according to the identifier of the application.

In one embodiment, in the above method, sending the access information query request via dedicated data specifically comprises:
sending a use request for dedicated data to a network device of the mobile operator; and
sending the access information query request to an access point information storage server by using a data channel that is between the user equipment and the access point information storage server and is established by the mobile operator in response to the use request for dedicated data, for processing by the access point information storage server.

In one embodiment, in the above method, sending the use request for dedicated data to the network device of the mobile operator specifically comprises:
sending the use request for dedicated data to the mobile operator by using a private data channel which is agreed upon by an application requesting to use dedicated data and the mobile operator, wherein the private data channel comprises at least one of: a private channel protocol, predetermined port information, predetermined domain name or IP address information, and wherein the use request for dedicated data carries an identifier of an application requesting to use the dedicated data.

In one embodiment, in the above method, processing by the access point information storage server comprises:
  receiving the access information query request by the access point information storage server;
  retrieving and processing access information of the one or more wireless access points; and
  sending the processed access information of the one or more wireless access points to the user equipment.

In one embodiment, in the above method, receiving the access information of the one or more wireless access points which is returned by the network device in response to the access information query request comprises:
  determining whether general data is available;
  if yes, receiving the access information of the one or more wireless access points which is returned by the network device in response to the access information query request via general data;
  if no, receiving the access information of the one or more wireless access points which is returned by the network device in response to the access information query request via dedicated data.

In one embodiment, in the above method, before sending the query request short message via the short message channel, the method further comprises:
  generating a query request short message according to the identification information of the one or more wireless access points.

In one embodiment, in the above method, generating the query request short message according to the identification information of the one or more wireless access points comprises:
  generating a query request short message according to encrypted or unencrypted identification information of the one or more wireless access points and an SP service code; or
  generating a query request short message to be sent to a specified SP service code according to encrypted or unencrypted identification information of the one or more wireless access points.

In one embodiment, in the above method, sending the query request short message via the short message channel specifically comprises:
  sending the query request short message to a short message center of an operator, forwarding, by the short message center of the operator, the query request short message to a short message gateway, sending, by the short message gateway, the query request short message to the access point information storage server according to an SP service code carried in the query request short message for processing by the access point information storage server.

In one embodiment, in the above method, processing by the access point information storage server comprises:
  parsing the query request short message, by the access point information storage server, to extract the identification information of the one or more wireless access points;
  retrieving and processing access information of the one or more wireless access points; and
  sending the processed identification information and access information of the one or more wireless access points to the user equipment.

In one embodiment, in the above method, receiving the access information of the one or more wireless access points which is returned by the network device in response to the query request short message comprises:
  receiving an access information short message which is returned by the network device in response to the query request short message, wherein the access information short message includes access information of the one or more wireless access points.

In one embodiment, in the above method, the method further comprises:
  parsing the access information; and
  connecting to one of the one or more wireless access points by using the access information.

In one embodiment, in the above method, the access information includes identification information and an access password of the one or more wireless access points.

A method for providing access information of a wireless access point at a service device is provided by the present invention. The method comprises:
  receiving an access information query request or a query request short message, wherein the access information query request or the query request short message includes identification information of one or more wireless access points;
  returning access information of the one or more wireless access points to a user equipment via mobile data in response to the access information query request when mobile data of the user equipment is available; and
  returning access information of the one or more wireless access points to the user equipment via a short message channel in response to the query request short message when mobile data of the user equipment is unavailable.

In one embodiment, in the above method, returning access information of the one or more wireless access points to the user equipment via mobile data in response to the access information query request when mobile data of the user equipment is available specifically comprises:
  returning the access information of the one or more wireless access points to the user equipment via general data when general data is available; and
  returning the access information of the one or more wireless access points to the user equipment by using a data channel that is between the user equipment and an access point information storage server and is established by a mobile operator in response to a use request for dedicated data when genera data is unavailable.

In one embodiment, in the above method, when the access information of the one or more wireless access points is returned to the user equipment via general data, the access information returned to the user equipment further includes an identifier of an application using general data, so that the mobile operator converts the general data consumed by the returning of the access information into dedicated data according to the identifier of the application.

In one embodiment, in the above method, returning access information of the one or more wireless access points to the user equipment via the short message channel in response to the query request short message when mobile data of the user equipment is unavailable specifically comprises:
  parsing the query request short message to extract identification information of the one or more wireless access points;
  retrieving and processing access information of the one or more wireless access points; and
  sending the processed access information of the one or more wireless access points to the user equipment via the short message channel.

In one embodiment, in the above method, sending the processed access information of the one or more wireless access points to the user equipment via the short message channel comprises:

generating an access information short message according to the processed access information of the one or more wireless access points;

sending the access information short message to a short message gateway of an operator, sending, by the short message gateway of the operator, the access information short message to a short message center; and sending, by the short message center, the access information short message to the user equipment.

In one embodiment, in the above method, the access information comprises identification information and an access password of the one or more wireless access points.

A device for obtaining access information of a wireless access point at a user equipment is also provided by the invention. The device includes a memory for storing computer program instructions and a processor for executing program instructions, wherein the computer program instructions, when executed by the processor, trigger the device to perform the above-mentioned methods.

A device for providing access information of a wireless access point at a service device is also provided by the invention. The device includes a memory for storing computer program instructions and a processor for executing program instructions, wherein the computer program instructions, when executed by the processor, trigger the device to perform the above-mentioned methods.

A computer readable medium storing computer readable instructions is also provided by the invention, wherein the computer readable instructions executable by a processor to implement the above-mentioned methods.

The above-mentioned at least one technical solution adopted by the embodiments of the present specification can achieve the following beneficial effects: regardless of whether the user equipment turns on its mobile data switch, it can obtain information such as a login password for accessing a wireless access point, which can meet the needs of the user to connect to a shared wireless access point under any circumstances, effectively improving the user's networking experience effect.

DESCRIPTIONS OF THE DRAWINGS

In order to more clearly explain the technical solutions in the embodiments of the present specification or in the prior art, the following will briefly introduce the drawings required in the description of the embodiments or the prior art. The drawings in the following description are merely some embodiments recorded in the present specification.

DETAILED EMBODIMENTS

The embodiments of the specification will be described below clearly and completely in conjunction with the drawings in the embodiments of the specification. The described embodiments are merely a part of the embodiments of the present application, not all the embodiments.

Figure 1:
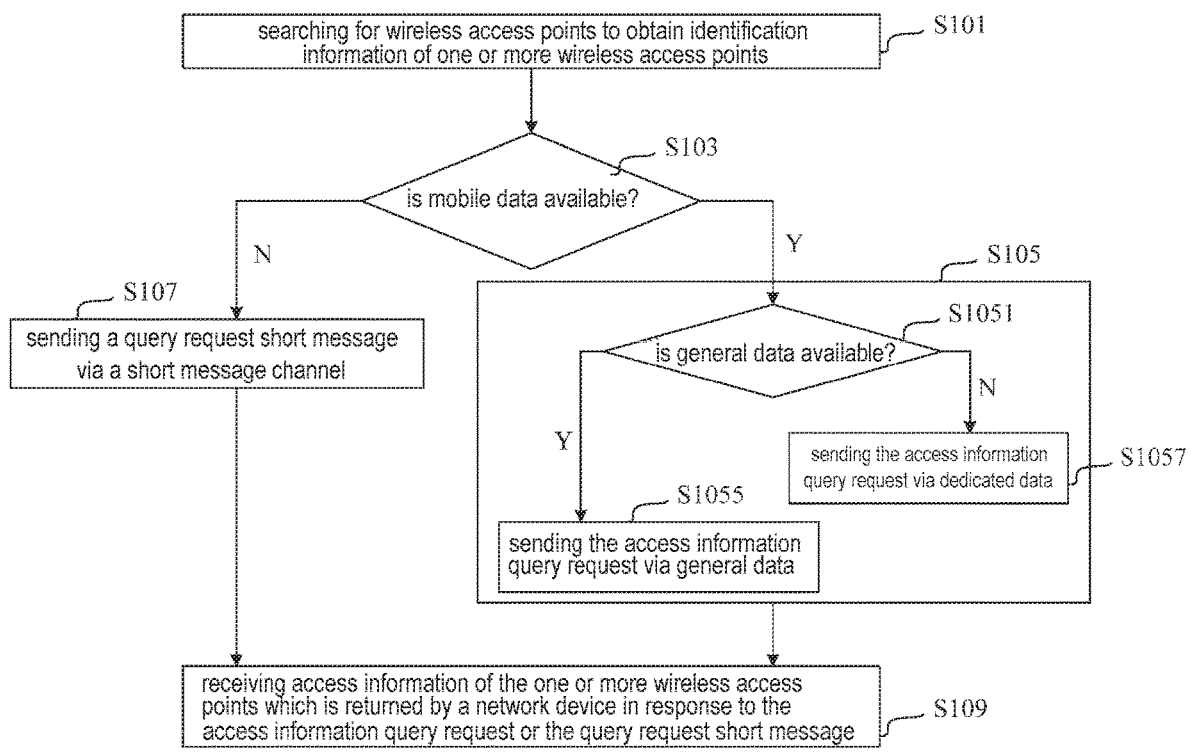
FIG. 1 is a flowchart of a method for obtaining access information of a wireless access point at a user equipment in an embodiment of the invention.

A method for obtaining access information of a wireless access point at a user equipment is provided in an embodiment of the invention. As illustrated in FIG. 1, FIG. 1 is a flowchart of a method for obtaining access information of a wireless access point at a user equipment in an embodiment of the invention. The method comprises: searching for wireless access points to obtain identification information of one or more wireless access points, as illustrated in step S101 in FIG. 1; determining whether mobile data is available, as illustrated in step S103 in FIG. 1; specifically, if yes, sending an access information query request via mobile data, wherein the access information query request includes the identification information of the one or more wireless access points, as illustrated in step S105 in FIG. 1; otherwise, sending a query request short message via a short message channel, wherein the query request short message includes the identification information of the one or more wireless access points, as illustrated in step S107 in FIG. 1; receiving access information of the one or more wireless access points which is returned by a network device in response to the access information query request or the query request short message, as illustrated in step S109 in FIG. 1.

At step S101, wireless access points are searched to obtain identification information of one or more wireless access points.

The user equipment may be a device that has the function of networking with a telecom operator, such as a mobile phone, a smart watch, etc. If the user equipment is a mobile phone, a mobile phone card (a SIM (Subscriber Identity Module, customer identification module) card) installed in the mobile phone is required to support mobile data. The wireless access point may be an access point that can be used for networking, such as a WiFi hotspot, a mobile hotspot, etc. For ease of understanding, a mobile phone connecting to a WiFi hotspot is used as an example for description below.

Assuming that the user equipment is a mobile phone, when the user turns on the wireless network switch of the mobile phone, signals of one or more wireless access points in the vicinity can be searched, and the user can select one or more WiFi hotspots with strong signals and to further obtain related identification information of the wireless access points.

At step S103, it is determined whether mobile data is available.

Specifically, in an embodiment of the invention, it is determined whether mobile data is available by determining whether the mobile data switch of the user equipment is turned on. Further, when the mobile data switch of the user equipment is turned on and the user identity card (SIM card) supports mobile data, it is determined that mobile data is available and the method proceeds to step S105; otherwise, it is determined that the mobile data of the user equipment is unavailable, and the method proceeds to step S107.

At step S105, the access information query request is sent via mobile data. The method then proceeds to step S109.

The access information query request includes identification information of the one or more wireless access points.

Specifically, as illustrated in FIG. 1, sending the access information query request via mobile data comprises: step S1051, determining whether general data is available; sending the access information query request via general data when general data is available, as illustrated in step S1053 in FIG. 1; sending the access information query request via dedicated data when general data is unavailable, as illustrated in step S1055 in FIG. 1.

At step S107, the query request short message is sent via a short message channel. The method then proceeds to step S109.

The query request short message is sent, wherein the query request short message includes identification information of the one or more wireless access points.

At step S109, access information of the one or more wireless access points which is returned by a network device in response to the access information query request or the query request short message is received.

On the basis of the above method illustrated in FIG. 1, methods of obtaining access information of a wireless access point via mobile data and via a short message channel by the user equipment will be set forth respectively in detail below.

A. Obtaining Access Information of a Wireless Access Point Via Mobile Data by the User Equipment The method will be performed on the basis of the above steps S1051 to S1055. In particular, general data is not dedicated data, i.e., data that requires to be purchased with payment by the user. In an example, assuming that the user wants to establish connection with a shared WiFi by his/her mobile phone, it needs to be determined at the first place whether the mobile phone is capable of data transmission via general data. Specifically, in an example, it can be checked with the operator as to whether the mobile card (the SIM card) supports mobile data and then it is determined whether the cell mobile data switch is turned on. If the mobile data switch is turned off, it is considered that general data of the user equipment is not available. In practical applications, when general data of the user's mobile phone is exhausted or when there is no general data available, or when the user forgets to turn on the general data switch, it is considered that general data is unavailable. In such cases, cell mobile data of the mobile phone may be turned on at background and the query request is sent to a specified access point information storage server via dedicated data.

The so-called dedicated data refers to data which is generated when an individual user uses a specified service or visits a specified webpage via the network provided by the operator when the user uses his/her mobile phone for network access. Dedicated data is primarily the data paid and purchased by a certain Internet company or enterprise from the operator. When a user uses a service provided by the company or enterprise, the user will no longer be charged by the operator for the data which is generated during such use.

Figure 2:
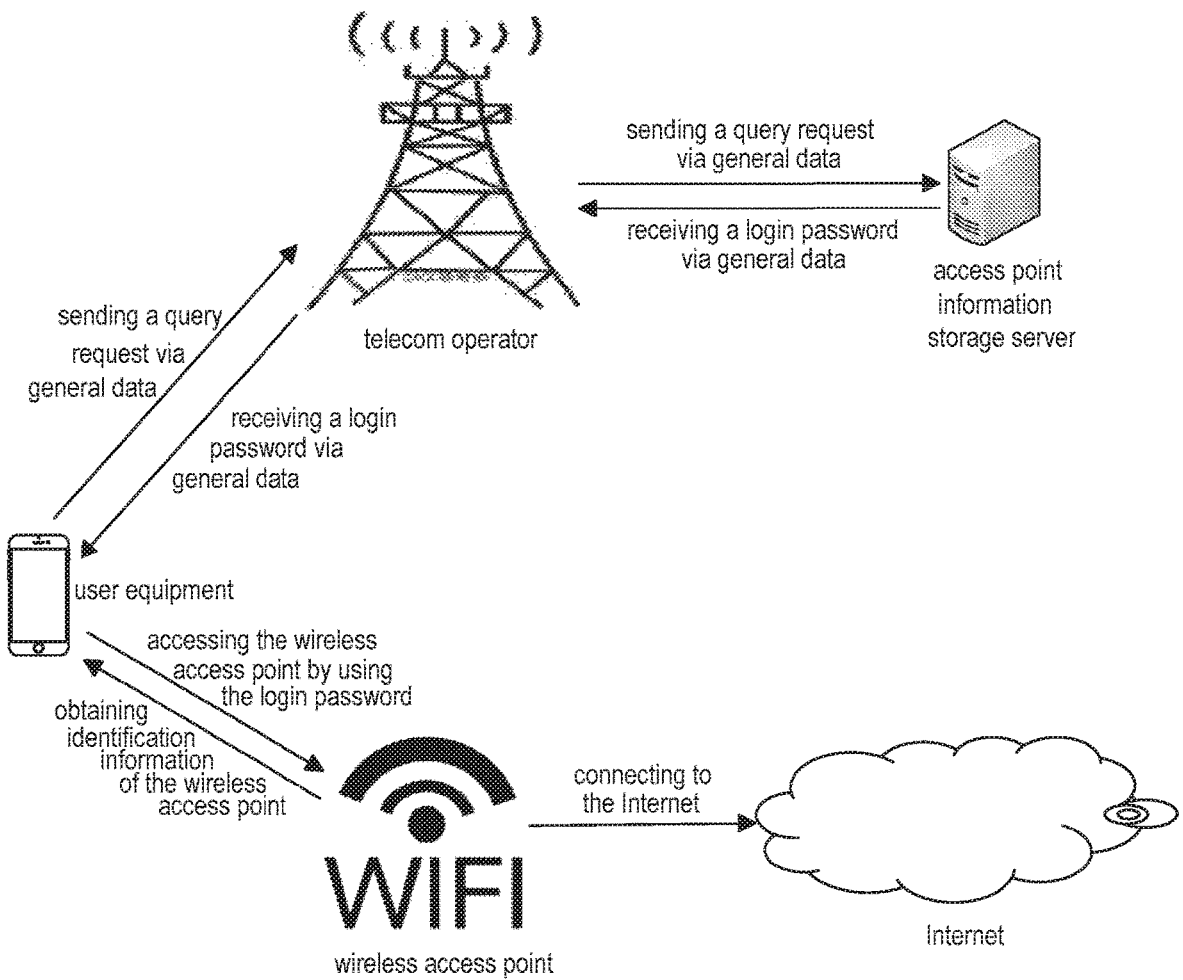
FIG. 2 is a schematic diagram of obtaining access information of a wireless access point via general data which is involved in a practical application scenario of the solution of the specification.

FIG. 2 is a schematic diagram of obtaining access information of a wireless access point via general data which is involved in a practical application scenario of the solution of the specification. The mobile phone of the user sends identification information of a wireless access point (e.g., a WiFi hotspot) to an access point information storage server via general data, and obtains corresponding access information (e.g., a login password) based on information of wireless access points, such as the SSID (Service Set Identifier, e.g., name of a wireless access point) and/or BSSID (Basic Service Set Identifier, a special application of Ad-hoc LAN, e.g., MAC address of a wireless access point) and the login password of a wireless access point, which is stored by the access point information storage server in advance. Further, after the access information is sent to the mobile phone of the user via general data, the mobile phone of the user may connect to the corresponding wireless access point.

Figure 3:
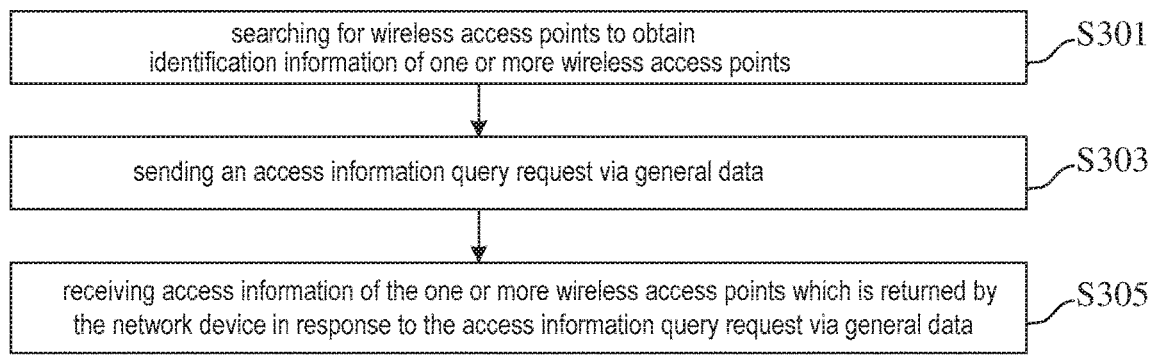
FIG. 3 is a schematic flowchart of a method for obtaining access information of a wireless access point via general data at a user equipment which is provided by an embodiment of the specification.

A method for obtaining access information of a wireless access point via general data at a user equipment is provided by an embodiment of the specification. A schematic flowchart of the method is illustrated in FIG. 3.

At step S301, wireless access points are searched to obtain identification information of one or more wireless access points. At step S303, an access information query request is sent via general data, wherein the access information query request includes the identification information of the one or more wireless access points.

Specifically, sending the access information query request via general data comprises: sending the access information query request to an access point information storage server by using a data channel that is between the user equipment and the access point information storage server and is provided by a mobile operator, for processing by the access point information storage server.

At step S305, the access information of the one or more wireless access points which is returned by the network device in response to the access information query request is received via general data.

Figure 4:
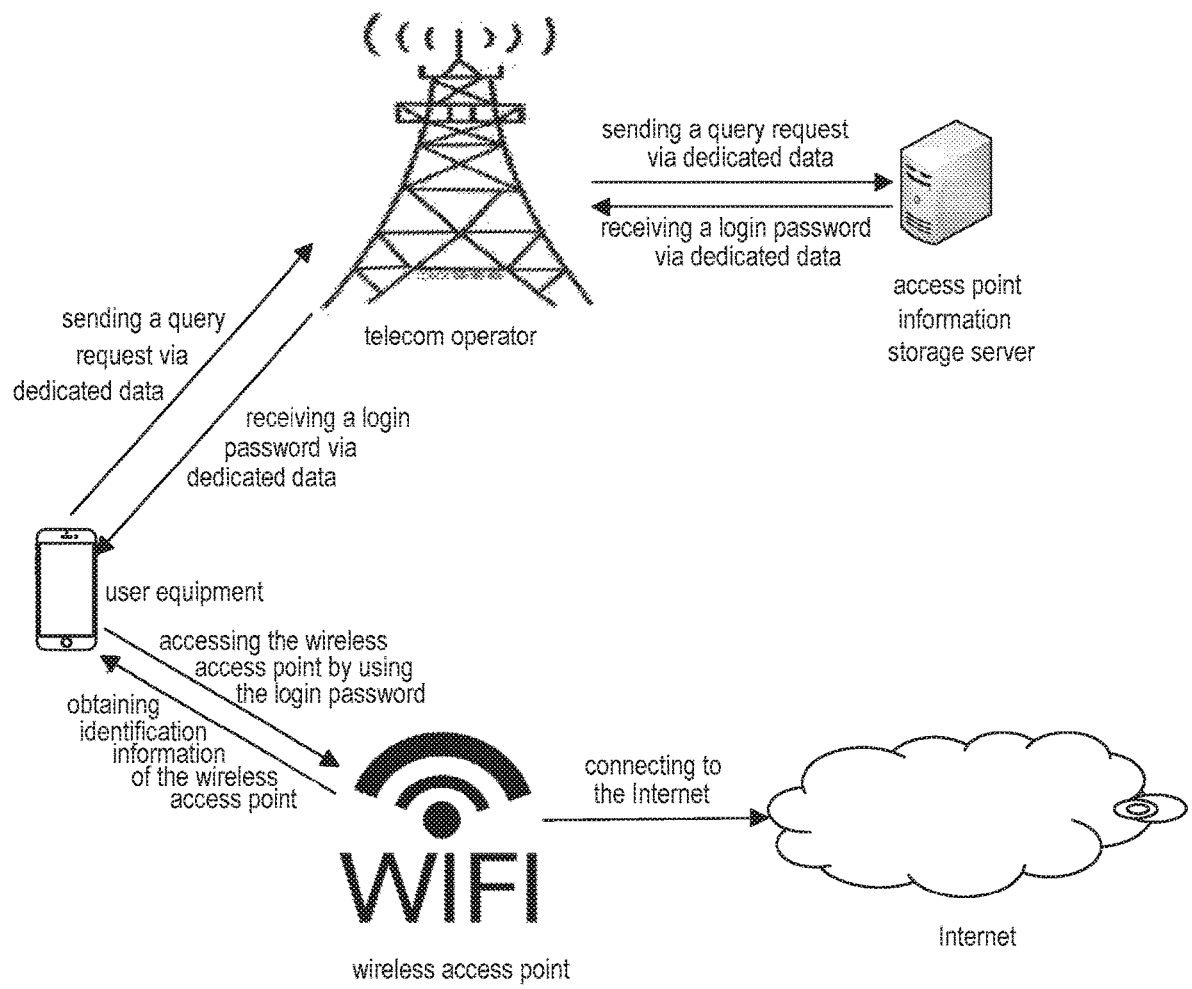
FIG. 4 is a schematic diagram of obtaining access information of a wireless access point via dedicated data which is involved in a practical application scenario of the solution of the specification.

FIG. 4 is a schematic diagram of obtaining access information of a wireless access point via dedicated data which is involved in a practical application scenario of the solution of the specification. When data of the mobile phone of the user is exhausted, the mobile phone of the user may send identification information of a wireless access point (e.g., a WiFi hotspot) to the access point information storage server via dedicated data, and obtain corresponding access information (e.g., a login password) based on information of wireless access points, such as the SSID (Service Set Identifier, e.g., name of a wireless access point) and/or BSSID (Basic Service Set Identifier, a special application of Ad-hoc LAN, e.g., MAC address of a wireless access point) and the login password of a wireless access point, which is stored by the access point information storage server in advance. Further, after the access information is sent to the mobile phone of the user via dedicated data, the mobile phone of the user may connect to the corresponding wireless access point.

It should be noted that the user equipment to be connected may be a device that has the function of networking with a telecom operator, such as a mobile phone, a smart watch, etc. If the user equipment to be connected is a mobile phone, a mobile phone card (a SIM (Subscriber Identity Module, customer identification module) card) installed in the mobile phone is required to support mobile data. The wireless access point can be an access point that can be used for networking, such as a WiFi hotspot, a mobile hotspot, etc.

Based on the schematic diagram of the above practical application scenario, the solution of the specification will be described in detail below.

A method for obtaining access information of a wireless access point via dedicated data at a user equipment is provided by an embodiment of the specification. A schematic flowchart of the method is illustrated in FIG. 5.

Figure 5:
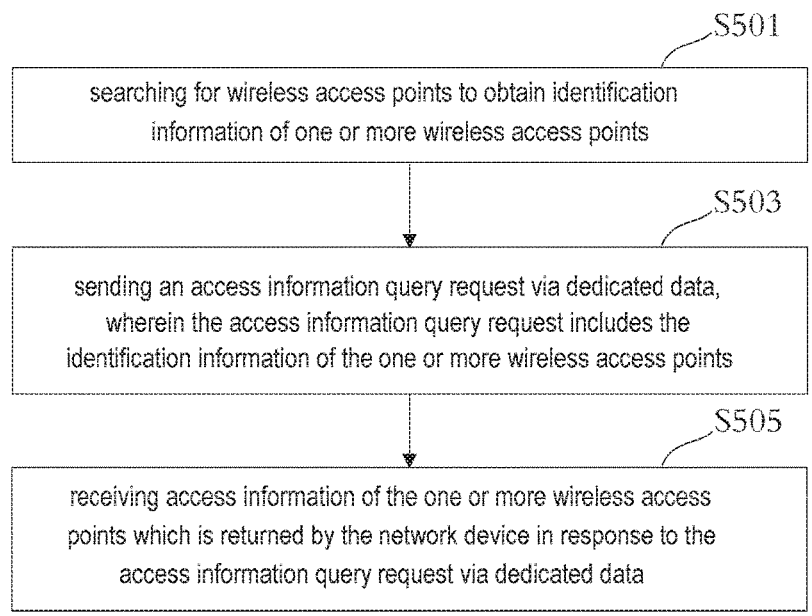
FIG. 5 is a schematic flowchart of a method for obtaining access information of a wireless access point via dedicated data at a user equipment which is provided by an embodiment of the specification.

FIG. 5 is schematic flowchart of a method for obtaining access information of a wireless access point via dedicated data at a user equipment which is provided by an embodiment of the specification. The method may specifically comprise the following steps: step S501, searching for wireless access points to obtain identification information of one or more wireless access points.

When the user turns on the wireless network switch on his/her mobile phone, signals of wireless access points in the vicinity can be searched. The user may select one or more wireless access points with strong signals according to his/her actual needs and may further obtain identification information of the wireless access point(s) to obtain corresponding access information (i.e., a login password), etc. The identification information includes the SSID and/or BSSID. In addition, the access information may also be transmitted in an encrypted manner to ensure security of access information transmission. After receiving the access information, the user equipment further parses the access information to derive the login password according to a preset algorithm. The identification information may also include position information and signal strength, which facilitates recommending login password and available and secure wireless access points to users more accurately.

It should be noted that the wireless access point described in the embodiments of the specification may be a WiFi hotspot or a mobile hotspot.

The method further comprises: step S503, sending the access information query request via dedicated data, wherein the access information query request includes the identification information of the one or more wireless access points.

Dedicated data is different from general data. Dedicated data has been agreed upon between the access point information storage server (in which case the access point information storage server may be understood as a server providing passwords of shared wireless access points to users) and the mobile operator and is used for data of data transmission between the user equipment and the access point information storage server. The user is unable to obtain other information via the dedicated data or use the dedicated data for data transmissions with other servers.

In practical applications, dedicated data is used to transmit small amounts of data temporarily. In an example, dedicated data is used to transmit small amounts of character information, such as a query request and access information. In an embodiment of the specification, when the transmission is completed, the user equipment suspends the dedicated data channel with the mobile operator. In such a case, the user equipment cannot use the dedicated data for transmissions of other data.

The method further comprises: step S505, receiving the access information of the one or more wireless access points which is returned by the network device in response to the access information query request via dedicated data.

As mentioned above, the access information query request carries the SSID and/or BSSID of a wireless access point, which corresponds to the access information. In an example, the SSID and/or BSSID of a wireless access point and corresponding access information may be stored in advance in a way which is based on a pointer, a key value pair, or a datasheet, so that corresponding access information may be easily retrieved according to a query request.

After obtaining the access information (e.g., a login password), the user equipment may establish a connection with the wireless access point by using the access information.

The above method may be implemented by an application running in the user equipment (e.g., a mobile phone, a smart watch). In an example, the application may be an APP (application) implementing sharing of wireless hotspots which is installed on the mobile phone.

It can be seen from the above method, dedicated data may be provided according to an agreement with the mobile operator through the access point information storage server. The user equipment may use the dedicated data to send the query request and obtain information, such as a login password for accessing the wireless access point, from the access point information storage server when general data of the user equipment is unavailable. User's need for connecting to a shared wireless access point may be satisfied when general data is unavailable, which effectively improves the networking experience effect of the user.

In one or more embodiments of the specification, sending the access information query request via dedicated data may specifically comprise: sending a use request for dedicated data to a network device of the mobile operator; sending the access information query request to the access point information storage server by using a data channel that is between the user equipment and the access point information storage server and is established by the mobile operator in response to the use request for dedicated data, for processing by the access point information storage server.

In an example, the mobile operator establishes a data channel with a user's mobile phone for dedicated data transmission after responding to the use request for dedicated data from the user's mobile phone. The data channel points to a corresponding access point information storage server. The user's mobile phone can only establish a connection with the access point information storage server via the data channel and cannot use the data channel for connection with other servers. This ensures the effect of dedicated use of the dedicated data and solves the problem of obtaining access information without network in case of exhausted general data of the user equipment.

In one or more embodiments of the specification, sending the use request for dedicated data to the network device of the mobile operator may specifically comprise: sending the use request for dedicated data to the mobile operator by using a private data channel which is agreed upon by an application requesting to use dedicated data and the mobile operator, wherein the private data channel comprises at least one of: a private channel protocol, predetermined port information, predetermined domain name or IP address information, and wherein the use request for dedicated data carries an identifier of an application requesting to use the dedicated data.

At present, a main technical solution to implement dedicated data is implemented by the operator configuring policy rules gateways in packet domain (data service) on the mobile network. An enterprise applying for purchase of dedicated data is required to provide policy related information that requires exemption, such as IP address, domain name, protocol and content keywords, etc. The operator configures corresponding policy information on gateway devices in packet domain. When an individual user uses the network of the operator via the user equipment and generates data, the gateway device parses data packets and performs matching according to corresponding rules. After matching, the gateway device generates a bill file labeled with a special identifier. After obtaining the bill file, a billing unit calculates fees according to a billing rule of the dedicated data based on the identifier on the bill file. Fees for the individual user will be exempted.

In one or more embodiments of the specification, processing by the access point information storage server may specifically comprise: receiving the access information query request by the access point information storage server; retrieving and processing access information of the one or more wireless access points; sending the processed access information of the one or more wireless access points to the user equipment.

It should be noted that the access information query request may be encrypted for the security of information transmission. After receiving the encrypted access information query request, the access point information storage server needs to parse the encrypted access information query request according to a preset parsing algorithm to obtain identification information of the wireless access point for query, including the SSID and/or BSSID. The access point information storage server retrieves the required access information, such as the login password, etc. from access points related information stored in advance in the access point information storage server according to the identification information.

In one or more embodiments of the specification, when the access information query request is sent via general data, the access information query request further includes an identifier of an application using general data, so that the mobile operator converts the general data consumed by the sending of the access information query request into dedicated data according to the identifier of the application.

In practical applications, a user sometimes forgets that his/her general data is exhausted and turns on the cell mobile data actively to send an access information query request, fees for general data consumption will be incurred. The mobile operator converts the general data consumed by the sending of the access information query request to dedicated data according to an identifier of an application of the user, which prevents unnecessary payment of the user. An identifier of an application as used herein refers to an identifier of an application software program which consumes data. The mobile operator converts the general data consumed by the sending of the access information query request into dedicated data according to an identifier of an application.

In one or more embodiments of the specification, after receiving the access information of the one or more wireless access points which is returned by the network device in response to the access information query request via dedicated data, the method further comprises: parsing the access information; connecting to one of the one or more wireless access points by using the access information.

In practical applications, the access information includes identification information and access password of a wireless access point. When attempting to connect to a wireless access point, login is implemented based on the identification information and access password of the wireless access point. Sometimes, identification information and access passwords of multiple wireless access points may be obtained at the same time to ensure the effect of login. When one wireless access point cannot be connected, a next wireless access point will be automatically selected and a wireless access point that can be connected will be selected eventually. When the multiple wireless access points obtained this time cannot be connected, the user is prompted of connection failure and other wireless access points will be recommended to the user.

Figure 6:
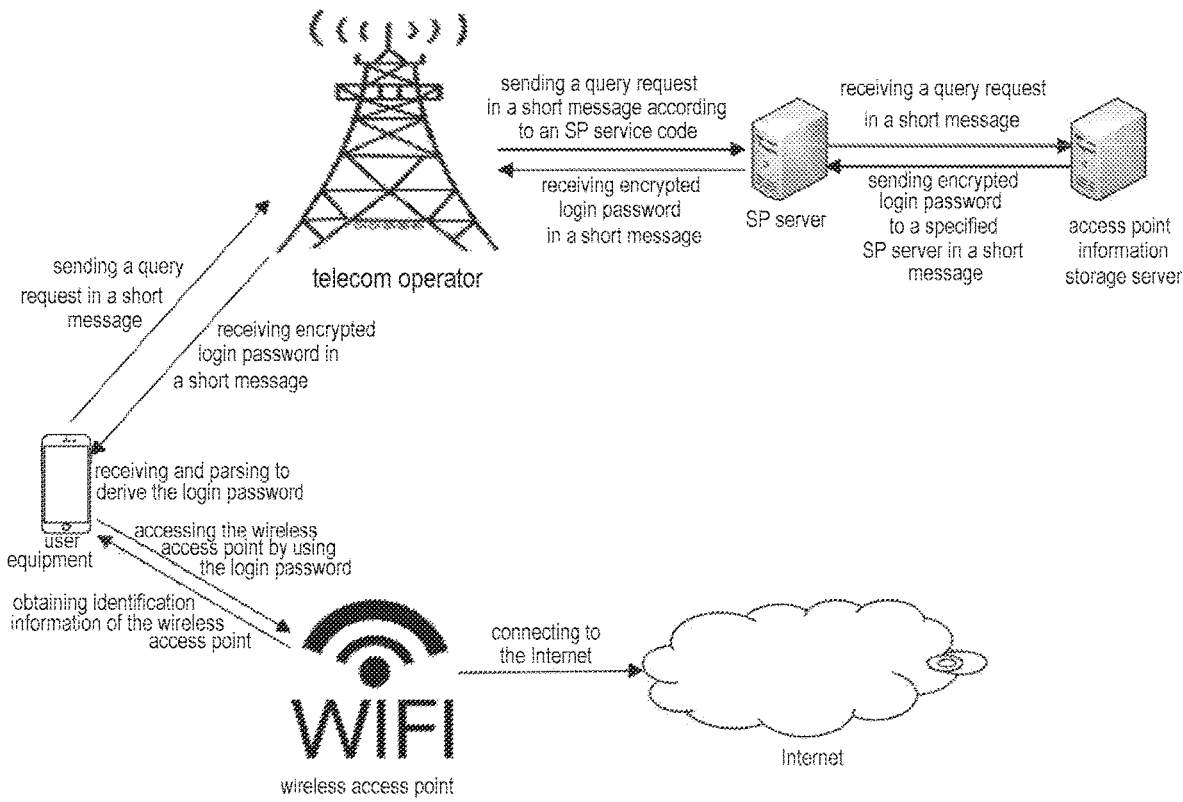
FIG. 6 is a schematic diagram of obtaining access information of a wireless access point via a short message channel which is involved in a practical application scenario of the solution of the specification.

B. Obtaining Access Information of a Wireless Access Point Via a Short Message Channel by the User Equipment FIG. 6 is a schematic diagram of obtaining access information of a wireless access point via a short message channel which is involved in a practical application scenario of the solution of the specification. When mobile data of a user's mobile phone is unavailable or when the user's mobile phone does not support mobile data, a query request carrying relevant information such as name, physical address, and service provider (SP) service code of a wireless access point can be sent to a telecom operator in a short message. The telecom operator obtains the SP service code from the short message. Further, the telecom operator sends the query request to a corresponding SP server according to the SP service code. The SP server sends the short message to a corresponding access point information storage server. Access information (e.g., a login password) corresponding to a wireless access point may be obtained based on information of various wireless access points such as name, physical address (MAC (Media Access Control or Medium Access Control)), and login password, etc. of a wireless access point, stored in advance in the access point information storage server. Further, encrypted access information such as the login password may be sent to the user's mobile phone in a short message. The user's mobile phone is able to connect to a corresponding wireless access point.

Based on the schematic diagram of FIG. 6 of the above practical application scenario, a solution in which access information of a wireless access point is obtained via a short message channel in the specification is described in detail below.

Figure 7:
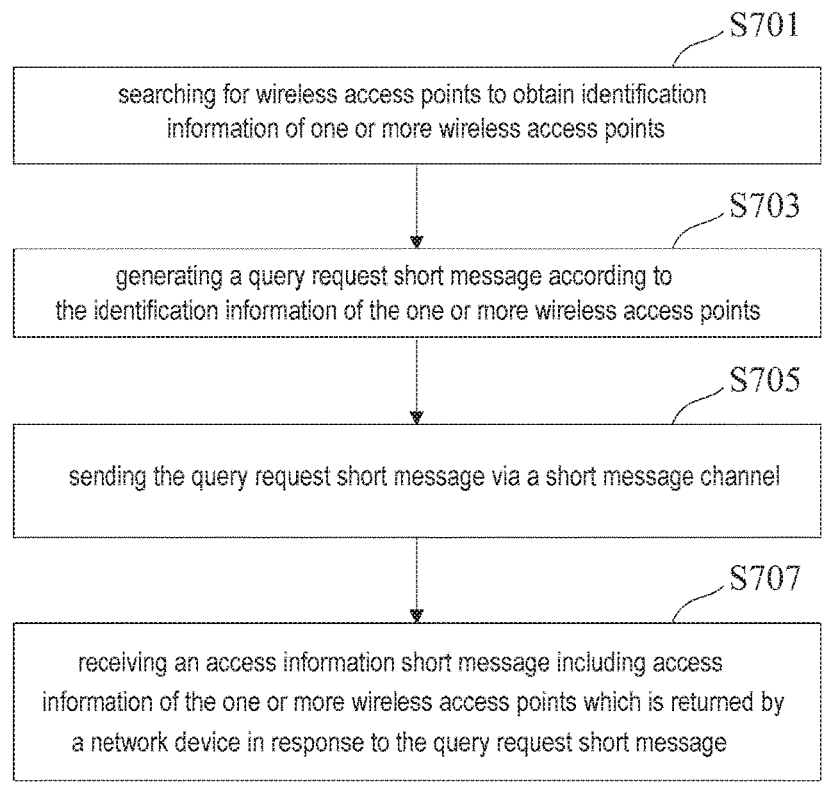
FIG. 7 is a flowchart of a method for obtaining access information of a wireless access point via a short message channel at a user equipment which is provided by an embodiment of the specification.

A method for obtaining access information of a wireless access point via a short message channel at a user equipment is provided by an embodiment of the specification. A schematic flowchart of the method is illustrated in FIG. 7, and the method may specifically comprise the following steps: step S701, searching for wireless access points to obtain identification information of one or more wireless access points.

Assuming that the user equipment is a mobile phone, when the user turns on the wireless network switch of the mobile phone, signals of one or more wireless access points in the vicinity can be searched, and the user can select one or more wireless access points with strong signals and to further obtain related identification information of the wireless access points.

It should be noted that the wireless access point described in the embodiments of the specification may be a WiFi hotspot or a mobile hotspot.

The method further comprises: step S703, generating a query request short message according to the identification information of the one or more wireless access points.

Identification information of a wireless access point may include information, such as SSID (Service Set Identifier, e.g., name of a wireless access point) and/or BSSID (Basic Service Set Identifier, a special application of Ad-hoc LAN, e.g., MAC address of a wireless access point), which is used to identify different wireless access points. In addition, the identification information may also include address information, signal strength, etc. of the wireless access point to better provide available wireless access points for users.

The method further comprises: step S705, sending the query request short message via a short message channel.

When mobile data is unavailable or when the user's mobile phone does not support mobile data, the query request is sent via the short message channel. It is understood that short messages may be sent based on a GSM (Global System for Mobile Communication) system. The GSM system has advantages such as good global versatility, wide signal coverage, etc. Therefore, even when mobile data is unavailable or when the user's mobile phone does not support mobile data, data can be sent in a short message. The query request may usually be in the form of a short message.

The method further comprises: step S707, receiving an access information short message including access information of the one or more wireless access points which is returned by a network device in response to the query request short message.

The network device may include a storage server for storing access information of wireless access points. The network device may also include devices used by operators to send short messages, e.g., a short message center, a short message gateway, a base station, etc. Generally, the network device responds to the query request in the following manner: after receiving the query request at the storage server, obtaining access information from the access information stored in the storage server in advance according to the query request and generating an access information short message, sending, by the storage server, the access information short message to a short message center, a short message gateway, a base station, etc. of the operator, and eventually the access information short message being received by the user equipment.

The user equipment (e.g., a mobile phone, a smart watch) may establish a connection with a wireless access point by using the access information (e.g., a login password) after obtaining the access information.

The above method may be implemented by an application running in the user equipment. In an example, the application may be an APP (application) implementing sharing of wireless hotspots which is installed on the mobile phone.

It can be seen from the above method, dedicated mobile data may be provided according to an agreement with the telecom operator through the access point information storage server. The user equipment may use the dedicated mobile data to send the query request and obtain information, such as a login password for accessing the wireless access point, from the access point information storage server when the mobile data of the user equipment is unavailable. User's need for connecting to a shared wireless access point may be satisfied with no mobile data, which effectively improves the networking experience effect of the user.

In one or more embodiments of the specification, before generating the query request short message according to the identification information of the wireless access point, the method further comprises: determining a usage state of mobile data; and when it is determined that mobile data is unavailable, generating the query request short message according to the identification information of the one or more wireless access points.

In an example, assuming that the user wants to establish a connection with a shared WiFi by his/her mobile phone, before sending the query request, it is determined whether the user's mobile phone can use mobile data. The determining method may be communicating with the telecom operator to check whether the mobile phone card (SIM card) supports mobile data, and further determining whether the mobile data connection of the mobile phone has been established (i.e., whether the switch of the wireless network connection of the mobile phone is turned on). When it is determined that the mobile data of the mobile phone is unavailable, a query request is generated according to the name and physical address of a searched wireless access point. It should be understood that the term "the mobile data is unavailable" used herein may indicate that the switch of the mobile data of the user equipment (e.g., the mobile phone) is turned off or the switch of the mobile data of the user equipment is turned on but the mobile phone cannot connect to the Internet by using the mobile data provided by the operator.

In one or more embodiments of the specification, generating the query request short message according to the identification information of the one or more wireless access points may specifically comprise: generating a query request short message according to encrypted or unencrypted identification information of the one or more wireless access points and an SP service code; or generating a query request short message to be sent to a specified SP service code according to encrypted or unencrypted identification information of the one or more wireless access points.

Generally, transmissions of short messages between the user equipment and the access point information storage server are implemented via an SP server. In an example, the user equipment edits and generates a short message according to a pre-allocated or specified SP service code after obtaining the identification information of the wireless access point, wherein the SP service code may be a part of the short message or may be a code for the receiving end. To ensure confidentiality of the transmission of the query request in short messages, the short messages may be encrypted to effectively improve security effect.

Sending the query request short message via the short message channel may specifically comprise: sending the query request short message to a short message center of an operator, forwarding, by the short message center of the operator, the query request short message to a short message gateway, sending, by the short message gateway, the query request short message to the access point information storage server according to an SP service code carried in the query request short message for processing by the access point information storage server.

A sender identifier (e.g., mobile phone number, etc.) is usually carried in the query request short message.

In practical applications, the SP server is an intermediate device connecting the telecom operator and the access point information storage server. The SP server is primarily used to forward the short message sent by the telecom operator to a corresponding access point information storage server, or to forward the short message generated by the access point information storage server to the operator. By way of the SP server, pressure on the access point information storage server regarding receiving and processing short messages can be effectively alleviated, which can effectively improve the working efficiency of the access point information storage server.

In practical applications, the SP server may be provided by the telecom operator, or may be an SP server specified by a business party, or may be an SP server provided by a third part. The SP server is usually arranged in the vicinity of a base station of the telecom operation or in a computer room of the telecom operation.

In an example, assuming that a software for sharing wireless access points is installed on the mobile phone, the software may automatically generate and send a short message according to the information in the query request. Specifically, the software extracts information of the searched wireless access point, generates text contents of a short message, and composes the receiving number of the short message according to a receiving identification of the access point information storage server and the SP server which is stored in advance in the software. Automatic generation and transmission of the query request short message may be implemented by using the software. Of course, it is possible for the user to edit the information in the query request as a short message and send it to a specified server manually.

In one or more embodiments of the specification, processing by the access point information storage server may specifically comprise: parsing the query request short message, by the access point information storage server, to extract the identification information of the one or more wireless access points; retrieving and processing access information of the one or more wireless access points; sending the processed identification information and access information of the one or more wireless access points to the user equipment.

After receiving the encrypted access information via the short message channel, the access point information storage server first parses the encrypted query request short message according to a preset parsing algorithm to obtain the identification information therein. Further, the access point information storage server retrieves access passwords (e.g., login passwords, etc.) of the corresponding one or more access points according to the identification information.

In one or more embodiments of the specification, the access information short message may specifically comprise: encrypted or unencrypted identification information of the one or more wireless access points; and encrypted or unencrypted access password of the one or more wireless access points.

To ensure that the access information can be transmitted securely, the access information and/or identification information needs to be encrypted. Further, the encrypted access information is used to generate the access information short message, which is sent to a corresponding user equipment according to the sender identifier.

In one or more embodiments of the specification, after receiving the access information short message including access information of the one or more wireless access points which is returned by the network device in response to the query request short message, the method further comprises: parsing the access information short message and extracting access information of the one or more wireless access points; connecting to one of the one or more wireless access points by using the access information.

In practical applications, the identification information of the wireless access point corresponds to the access password of the wireless access point one by one. When attempting to connect to the wireless access point, login is implemented via the identification information and the access password of the wireless access point. Sometimes identification information and access passwords of multiple wireless access points may be obtained at the same time to ensure the login effect. When one wireless access point cannot be connected, a next wireless access point will be automatically selected and a wireless access point that can be connected will be selected eventually. When the multiple wireless access points obtained this time cannot be connected, the user is prompted of connection failure and other wireless access points will be recommended to the user.

A device for obtaining access information of a wireless access point at a user equipment is also provided by an embodiment of the specification based on a similar principle. The device includes a memory for storing computer program instructions and a processor for executing program instructions, wherein the computer program instructions, when executed by the processor, trigger the device to perform the above-mentioned methods.

Figure 8:
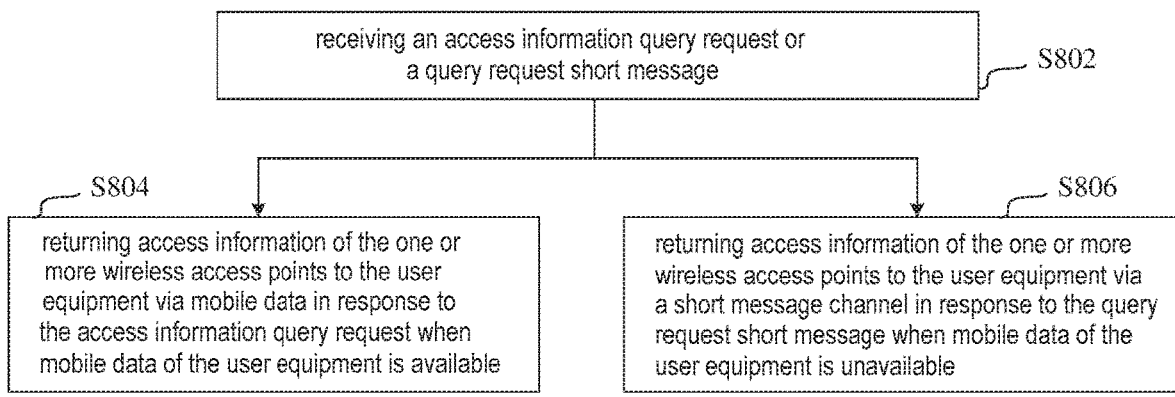
FIG. 8 is a flowchart of a method for providing access information of a wireless access point at a service device which is provided in an embodiment of the specification.

A method for providing access information of a wireless access point at a service device is also provided by an embodiment of the specification based on a similar principle. A schematic flowchart of the method is illustrated in FIG. 8, and the method may specifically comprise: receiving an access information query request or a query request short message, wherein the access information query request or the query request short message includes identification information of one or more wireless access points, as illustrated in step S802 in FIG. 8; and returning access information of the one or more wireless access points to the user equipment via mobile data in response to the access information query request when mobile data of the user equipment is available, as illustrated in step S804 in FIG. 8; returning access information of the one or more wireless access points to the user equipment via a short message channel in response to the query request short message when mobile data of the user equipment is unavailable, as illustrated in step S806 in FIG. 8.

At the above step S804, the access information of the one or more wireless access points is returned to the user equipment via general data when general data is available. Specifically, the access information query request is received via general data, wherein the access information query request includes identification information of the one or more wireless access points. The access information of the one or more wireless access points is returned to the user equipment via general data in response to the access information query request.

Figure 9:
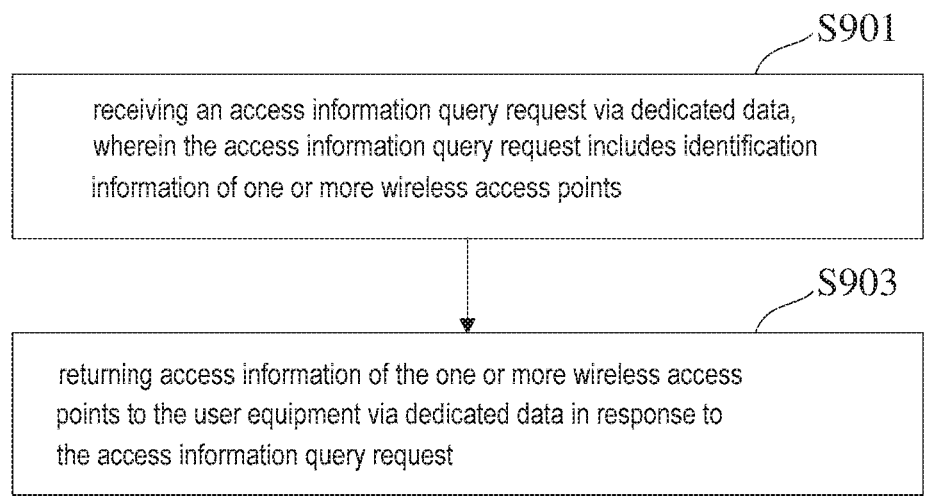
FIG. 9 is a schematic flowchart of a method for providing access information of a wireless access point via dedicated data at a service device in an embodiment of the invention.

The access information of the one or more wireless access points is returned to the user equipment by using a data channel that is between the user equipment and the access point information storage server and is established by the mobile operator in response to a use request for dedicated data when mobile data is available but general data is not available, as illustrated in FIG. 9.

Figure 10:
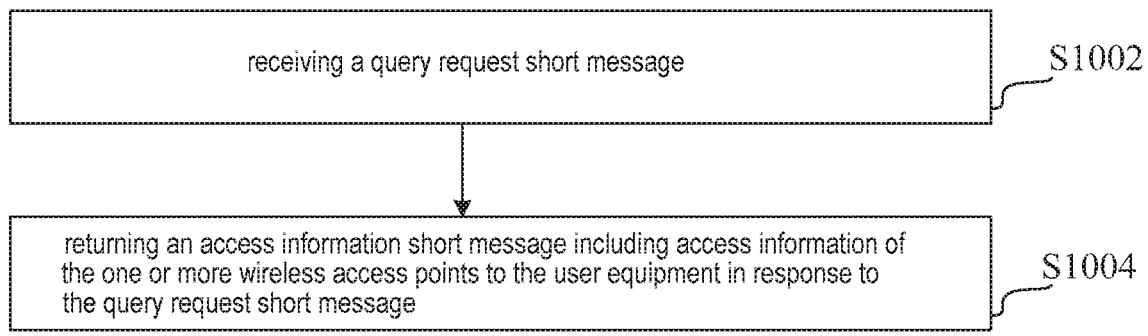
FIG. 10 is a schematic flowchart of a method for providing access information of a wireless access point via a short message channel at a service device which is provided by an embodiment of the invention.

At the above step S806, the access information of the one or more wireless access points is returned to the user equipment via a short message channel in response to the query request short message when mobile data is not available, as illustrated in FIG. 10.

FIG. 9 is a schematic flowchart of a method for providing access information of a wireless access point via dedicated data at a service device in an embodiment of the invention.

Step S901, an access information query request is received via dedicated data, wherein the access information query request includes identification information of one or more wireless access points.

Dedicated data refers to data which is generated when an individual user uses a specified service or visits a specified webpage via the network provided by the operator when the user uses his/her mobile phone for network access. Dedicated data is primarily the data paid and purchased by a certain Internet company or enterprise from the operator. When a user uses a service provided by the company or enterprise, the user will no longer be charged by the operator for the data which is generated during such use.

The access information query request generally carries a small amount of data information, for example, the query request may carry related information to the access point information storage server, such as IP address, SSID, BSSID, etc. Sending the query request via dedicated data for one time will not consume much data and will not increase data transmission burden on the access point information storage server.

In addition, the access information query request may also carry address information of a wireless access point and the like to improve the accuracy of the effect of matching between the wireless access point and access information. If match does not succeed, a business server may actively recommend available wireless access points in the vicinity and information such as corresponding login passwords according to the address information.

Step S903, access information of the one or more wireless access points is returned to the user equipment via dedicated data in response to the access information query request.

The user equipment to be connected may be a device capable of networking functions such as a mobile phone, a smart watch, etc.

It should be noted that dedicated data is different from general data. Dedicated data may be data transmitted between the user equipment and the access point information storage server which has been agreed upon by the access point information storage server and the mobile operator. The user is unable to obtain other information via the dedicated data or use the dedicated data for data transmissions with other servers. Dedicated data is obtained by using a specified port or domain name which has been agreed upon by the access point information storage server and the mobile operator. When authenticating for connection, IP address, domain name, protocol, content keywords can be used for authentication.

In one or more embodiments of the specification, returning the access information of the one or more wireless access points to the user equipment via dedicated data may specifically comprise:
  returning the access information of the one or more wireless access points to the user equipment via general data when it is determined that general data is available; and
  returning the access information of the one or more wireless access points to the user equipment by using a data channel that is between the user equipment and the access point information storage server and is established by the mobile operator in response to a use request for dedicated data when it is determined that general data is unavailable.

At present, a main technical solution to implement dedicated data is implemented by the operator configuring policy rules at gateways in packet domain (data service) on the mobile network. An enterprise applying for purchase of dedicated data is required to provide policy related information that requires exemption, such as IP address, domain name, protocol and content keywords, etc. The operator configures corresponding policy information on gateway devices in packet domain.

In one or more embodiments of the specification, after receiving the access information query request via dedicated data, the method further comprise: retrieving and processing access information of the one or more wireless access points; sending the processed access information of the one or more wireless access points to the user equipment.

In practical applications, identification information of a wireless access point may change. For example, the user may change the name of a WiFi router. In order to ensure effective login, multiple pieces of identification information and corresponding access information sometimes can be obtained at the same time. When one wireless access point cannot be connected, the target of connecting will automatically change to a next access point, and eventually a wireless access point that can be connected is selected. When all of the multiple access points obtained this time cannot be connected, the user is prompted of connection failure, and other wireless access points are recommended to the user.

In one or more embodiments of the specification, when the access information of the one or more wireless access points is returned to the user equipment via general data, the access information returned to the user equipment comprises an identifier of an application using general data, so that the mobile operator converts the general data consumed by the returning of the access information into dedicated data according to the identifier of the application.

In an example, when an individual user uses the network of the operator via the user equipment and generates data, the gateway device parses data packets and performs matching according to corresponding rules. After matching, the gateway device generates a bill file labeled with a special identifier. After obtaining the bill file, a billing unit calculates fees according to a billing rule of the dedicated data based on the identifier on the bill file. Fees for the individual user will be exempted.

FIG. 10 is a schematic flowchart of a method for providing access information of a wireless access point via a short message channel at a service device provided by an embodiment of the invention.

Step S1002, a query request short message is received, wherein the query request short message is generated according to identification information of one or more wireless access points.

When mobile data is unavailable, the service device (i.e., an access point information storage server) receives short messages via the short message channel. The query request short message may contain identification information of one or more wireless access points. Since some wireless access points are not available, identification information of one or more wireless access points is usually carried in one short message to improve success rate of connection.

Step S1004, an access information short message including access information of the one or more wireless access points is returned to the user equipment in response to the query request short message.

Access information of the wireless access point is determined according to the query request.

The query request carries SSID and/or BSSID. The SSID and/or BSSID and access information are stored in the access point information storage server in a preset correspondence manner. In an example, name, MAC address and corresponding access information of a wireless access point may be stored in advance in a manner which is based on a pointer, a key value pair or a datasheet, so that corresponding access information may be easily retrieved according to the query request short message.

Of course, in order to more accurately locate the required access information, access information may be determined according to the actual location of the wireless access point which is carried in the query request. When the wireless access point cannot be accessed, the access point information storage server may also recommend a shared wireless access point in the vicinity which is available based on the actual location, which can effectively improve the user experience.

In one or more embodiments of the specification, returning the access information short message including access information of the one or more wireless access points to the user equipment in response to the query request short message may specifically comprise: parsing the query request short message to extract identification information of the one or more wireless access points; retrieving and processing access information of the one or more wireless access points; sending the processed identification information and access information of the one or more wireless access points to the user equipment.

After receiving the encrypted access information short message via the short message channel, the access point information storage server first parses the encrypted query request short message according to a preset parsing algorithm to obtain the identification information therein. Further, the access point information storage server retrieves access information (e.g., login passwords, etc.) of the corresponding one or more access points according to the identification information.

In one or more embodiments of the specification, sending the processed identification information and access information of the one or more wireless access points to the user equipment may specifically comprise: generating an access information short message according to the processed identification information and access information of the one or more wireless access points; sending the access information short message to a short message gateway of the operator, sending, by the short message gateway of the operator, the access information short message to a short message center; sending, by the short message center, the access information short message to the user equipment.

The access point information storage server sends the identification information and corresponding access information to the gateway of the operator and the short message center by way of short messages according to the sender identifier after obtaining the identification information and corresponding access information. The short message center sends the identification information and corresponding access information to a corresponding user equipment according to the sender identifier.

In one or more embodiments of the specification, the access information short message may specifically comprise: encrypted or unencrypted identification information of the one or more wireless access points; and encrypted or unencrypted access password of the one or more wireless access points.

To ensure that the access information can be transmitted securely, the access information needs to be encrypted. Further, the encrypted access information is used to generate the access information short message, which is sent to a corresponding user equipment according to the sender identifier.

A device for providing access information of a wireless access point at a service device is also provided by an embodiment of the specification based on a similar principle. The device includes a memory for storing computer program instructions and a processor for executing program instructions, wherein the computer program instructions, when executed by the processor, trigger the device to perform the above-mentioned methods.

A computer readable medium storing computer readable instructions is also provided by an embodiment of the specification based on a similar principle, wherein the computer readable instructions executable by a processor to implement the above-mentioned methods.

The embodiments in the specification are described in a progressive manner. The identical or similar parts among the embodiments can be referred to each other, and an aspect detailed and emphasized by each embodiment is the part which is different from that in other embodiments. In particular, for the device and media embodiments, since they are basically similar to the method embodiments, the description is relatively simple, and the relevant parts can be referred to a part of the description of the method embodiments.

The devices and the media provided in the embodiments of the present application correspond to the method in a one-to-one manner. Therefore, the devices and the media also have beneficial technical effects similar to their corresponding methods. The beneficial technical effects of devices and media are not repeated here since the beneficial technical effects of the methods have been described in detail above.

The embodiments of the present invention may be provided as methods, systems, or computer program products. Therefore, the present invention may take the form of an embodiment entirely implemented in hardware, an embodiment entirely implemented in software, or an embodiment implemented by combining software and hardware. Moreover, the present invention may take the form of a computer program product implemented on one or more computer usable storage media (including but not limited to disk storage, CD-ROM, optical storage, etc.) containing computer usable program code.

The present invention is described with reference to flowcharts and/or block diagrams of methods, devices (systems), and computer program products according to the embodiments of the present invention. It should be understood that each flow and/or block in the flowchart and/or block diagram and a combination of the flow and/or block in the flowchart and/or block diagram may be implemented by computer program instructions. These computer program instructions can be provided to a processor of a general-purpose computer, a special-purpose computer, an embedded processing machine, or other programmable data processing devices to produce a machine that enables the instructions executed by the processor of the computer or other programmable data processing devices to produce an apparatus for implementing the functions specified in one flow or multiple flows of a flowchart and/or one block or multiple blocks of a block diagram.

These computer program instructions may also be stored in a computer readable memory that can direct a computer or other programmable data processing devices to work in a specific manner, so that the instructions stored in the computer readable memory produce an article of manufacture including an instruction device, and the instruction device implements the functions specified in one block or multiple blocks of a flowchart and/or one block or multiple blocks of a block diagram.

These computer program instructions can also be loaded onto a computer or other programmable data processing devices, so that a series of operating steps are performed on the computer or other programmable devices to produce computer-implemented processing, so that the instructions executed on the computer or other programmable devices provide steps for implementing the functions specified in one flow or multiple flows of a flowchart and/or one block or multiple blocks in a block diagram.

In a typical configuration, a computing device includes one or more processors (CPUs), input/output interfaces, network interfaces, and memories.

The memory may include a non-permanent memory, a random access memory (RAM) and/or a non-volatile memory and the like in a computer-readable medium, such as a read-only memory (ROM) or a flash memory (flash RAM)). A memory is an example of a computer-readable medium.

A computer-readable medium comprises permanent and non-permanent, movable and non-movable media and may implement information storage by means of any method or technology. Information may be computer-readable instructions, data structures, program modules or other data. The examples of a computer storage medium include but are not limited to a phase change memory (PRAM), a static random access memory (SRAM), a dynamic random access memory (DRAM), other types of random access memory (RAM), a read-only memory (ROM), an electrically erasable programmable read-only memory (EEPROM), a flash memory or other memory technologies, compact disk read-only memory (CD-ROM), a digital versatile disc (DVD) or other optical storages, a magnetic cassette tape, and magnetic tape and magnetic disk storage or other magnetic storage devices or any other non-transmission media, which can be used to store information that can be accessed by a computing device. According to the definition herein, the computer-readable medium does not include a non-transitory computer-readable medium, such as a modulated data signal and a carrier.

It should also be noted that the terms "comprise", "include", "contain" or any other variant thereof are intended to cover non-exclusive inclusion, so that a process, method, goods or device that includes a series of elements not only includes those elements, but also includes other elements not explicitly listed, or include elements inherent to such process, method, goods, or device. With no further restrictions, the element defined by the sentence "include a . . . " does not exclude that there are other identical elements in the process, method, goods, or device that includes the element.

The above are only embodiments of the present application, and are not intended to limit the present application. The present application may have various alterations and variations. Any modification, equivalent replacement, improvement, etc. made within the spirit and principle of the present application shall be included in the scope of the claims of the present application.

What is claimed is:

1. A method for obtaining access information of a wireless access point at a user equipment, comprising:
   searching for wireless access points to obtain identification information of one or more wireless access points;
   determining whether mobile data is available;
   if yes, sending an access information query request via mobile data, wherein the access information query request comprises the identification information of the one or more wireless access points;
   if no, sending a query request short message via a short message channel, wherein the query request short message comprises the identification information of the one or more wireless access points, including:
      determining whether general data is available;
      if yes, sending the access information query request via general data;
      if no, sending the access information query request via dedicated data; and
   receiving access information of the one or more wireless access points which is returned by a network device in response to the access information query request or the query request short message.

2. The method as recited in claim 1, wherein the step of determining whether mobile data is available comprising:
   determining whether mobile data of the user equipment is available;
   if yes, determining that the mobile data is available;
   if no, determining that the mobile data is unavailable.

3. The method as recited in claim 1, wherein the step of sending the access information query request via general data specifically comprising:
   sending the access information query request to an access point information storage server by using a data channel that is between the user equipment and the access point information storage server and is provided by a mobile operator, for processing by the access point information storage server.

4. The method as recited in claim 3, wherein when the access information query request is sent via general data, the access information query request further comprises an identifier of an application using general data, so that the mobile operator converts the general data consumed by the step of sending of the access information query request into dedicated data according to the identifier of the application.

5. The method as recited in claim 3, wherein the step of processing by the access point information storage server comprising:
   receiving the access information query request by the access point information storage server;
   retrieving and processing access information of the one or more wireless access points; and
   sending the processed access information of the one or more wireless access points to the user equipment.

6. The method as recited in claim 1, wherein the step of sending the access information query request via dedicated data specifically comprising:
   sending a use request for dedicated data to a network device of a mobile operator; and
   sending the access information query request to an access point information storage server by using a data channel that is between the user equipment and the access point information storage server and is established by the mobile operator in response to the use request for dedicated data, for processing by the access point information storage server.

7. The method as recited in claim 6, wherein the step of sending a use request for dedicated data to the network device of the mobile operator specifically comprising:
   sending the use request for dedicated data to the mobile operator by using a private data channel which is agreed upon by an application requesting to use dedicated data and the mobile operator, wherein the private data channel comprises at least one of: a private channel protocol, predetermined port information, predetermined domain name or IP address information, and wherein the use request for dedicated data carries an identifier of an application requesting to use the dedicated data.

8. The method as recited in claim 1, wherein the step of receiving the access information of the one or more wireless access points which is returned by the network device in response to the access information query request comprising:

determining whether general data is available;
if yes, receiving the access information of the one or more wireless access points which is returned by the network device in response to the access information query request via general data;
if no, receiving the access information of the one or more wireless access points which is returned by the network device in response to the access information query request via dedicated data.

9. The method as recited in claim 1, wherein before the step of sending the query request short message via the short message channel, the method further comprising:
generating a query request short message according to identification information of the one or more wireless access points.

10. The method as recited in claim 9, wherein the step of generating the query request short message according to the identification information of the one or more wireless access points comprising:
generating a query request short message according to encrypted or unencrypted identification information of the one or more wireless access points and an SP service code; or
generating a query request short message to be sent to a specified SP service code according to encrypted or unencrypted identification information of the one or more wireless access points.

11. The method as recited in claim 10, wherein the step of sending the query request short message via the short message channel specifically comprising:
sending the query request short message to a short message center of an operator, forwarding, by the short message center of the operator, the query request short message to a short message gateway, sending, by the short message gateway, the query request short message to the access point information storage server according to an SP service code carried in the query request short message, for processing by the access point information storage server.

12. The method as recited in claim 11, wherein the step of processing by the access point information storage server comprising:
parsing the query request short message, by the access point information storage server, to extract the identification information of the one or more wireless access points;
retrieving and processing access information of the one or more wireless access points; and
sending the processed identification information and access information of the one or more wireless access points to the user equipment.

13. The method as recited in claim 1, wherein the step of receiving the access information of the one or more wireless access points which is returned by the network device in response to the query request short message comprising:
receiving the access information short message which is returned by the network device in response to the query request short message, wherein the access information short message comprises the access information of the one or more wireless access points.

14. The method as recited in claim 1, wherein the method further comprising:
parsing the access information; and
connecting to one of the one or more wireless access points by using the access information.

15. A method for providing access information of a wireless access point at a service device, comprising:
receiving an access information query request or a query request short message, wherein the access information query request or the query request short message comprises identification information of one or more wireless access points;
returning access information of the one or more wireless access points to a user equipment via mobile data in response to the access information query request when mobile data of the user equipment is available, including:
returning the access information of the one or more wireless access points to the user equipment via general data when general data is available; and
returning the access information of the one or more wireless access points to the user equipment by using a data channel that is between the user equipment and an access point information storage server and is established by a mobile operator in response to a use request for dedicated data when general data is not available; and
returning access information of the one or more wireless access points to the user equipment via a short message channel in response to the query request short message when mobile data of the user equipment is unavailable.

16. The method as recited in claim 15, wherein the step of returning the access information of the one or more wireless access points to the user equipment via a short message channel in response to the query request short message when mobile data of the user equipment is unavailable specifically comprising:
parsing the query request short message to extract identification information of the one or more wireless access points;
retrieving and processing access information of the one or more wireless access points; and
sending the processed access information of the one or more wireless access points to the user equipment via the short message channel.

17. The method as recited in claim 16, wherein the step of sending the processed access information of the one or more wireless access points to the user equipment via the short message channel comprising:
generating an access information short message according to the processed access information of the one or more wireless access points;
sending the access information short message to a short message gateway of the operator, sending, by the short message gateway of the operator, the access information short message to a short message center; and
sending, by the short message center, the access information short message to the user equipment.

18. A device for obtaining access information of a wireless access point at a user equipment, the device including a memory for storing computer program instructions and a processor for executing program instructions, wherein the computer program instructions, when executed by the processor, trigger the device to:
searching for wireless access points to obtain identification information of one or more wireless access points;
determining whether mobile data is available;
if yes, sending an access information query request via mobile data, wherein the access information query request comprises the identification information of the one or more wireless access points;
if no, sending a query request short message via a short message channel, wherein the query request short message comprises the identification information of the one or more wireless access points, including:
determining whether general data is available;
if yes, sending the access information query request via general data;
if no, sending the access information query request via dedicated data; and
receiving access information of the one or more wireless access points which is returned by a network device in response to the access information query request or the query request short message.

* * * * *